UNITED STATES PATENT OFFICE.

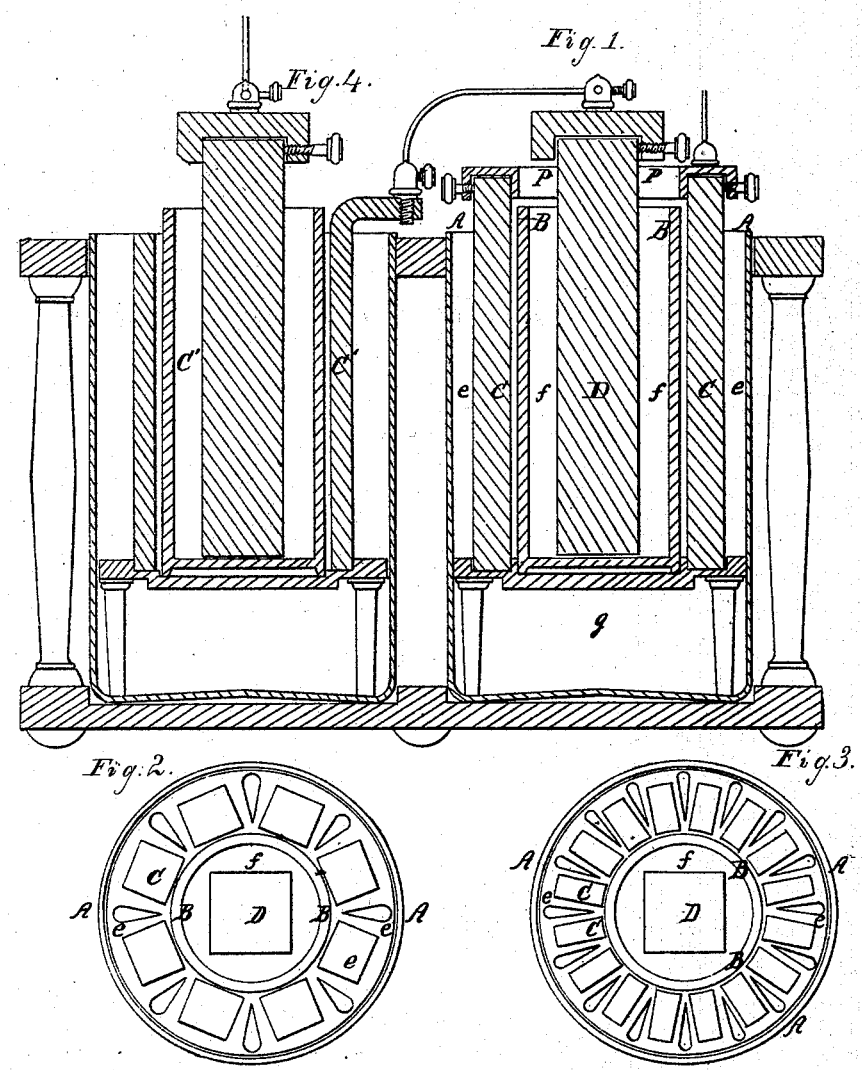

DANIEL J. BROWNE AND CYRUS W. BALDWIN, OF BOSTON, MASS.

IMPROVEMENT IN GALVANIC BATTERIES.

Specification forming part of Letters Patent No. 47,389, dated April 25, 1865.

*To all whom it may concern:*

Be it known that we, DANIEL J. BROWNE and CYRUS W. BALDWIN, both of the city of Boston, in the county of Suffolk and Commonwealth of Massachusetts, have discovered and invented a new and Improved Voltaic or Galvanic Battery by a new combination and arrangement of materials, which may be described and explained as follows:

This battery may consist of a pair of cells, or compounded by a series of a few or many double cells, varying in size, form, and arrangement according to the purposes for which it is intended, employing wrought or malleable iron or cast-iron for the electro-positive plate or plates, cylinders, prisms, or conducting substance; plumbago, charcoal, or hard gas-coke (the carbonaceous incrustation formed in the retorts of gas-works) for the electro-negative plate, cylinder, prism, or conducting substance; sulphuric and nitric acids, diluted with water, or diluted sulphuric acid and water alone, for the compound conducting intermediate fluid in the outer cell; and concentrated nitric acid, or a mixture of sulphuric acid and bichromate of potash with water, as the exciting decomposing agent for removing the hydrogen adhering to or surrounding the carbonaceous or electro-negative plate, cylinder, or prism contained within the porous diaphragm, cup, or inner cell, keeping in view and observing under all circumstances the following leading principles, which will enable the operator to conduct his various processes to the best advantage:

I. In order to make a good voltaic battery, two conducting metals or substances must be employed, one being electro-positive, having a strong affinity for oxygen and susceptible of rapid oxidation, and the other electro-negative and susceptible of little or no oxidation. A compound conducting-fluid must intervene between the last-named substances or plates capable of being decomposed, and the resulting product (the voltaic current) should be allowed to pass as rapidly as possible out of the sphere of its origin by the solvent powers of that fluid. The electro-positive substance should have the strongest possible affinity for one element (oxygen) of that fluid and the electro-negative substance the least possible affinity for oxygen. The quantity of voltaic force, however, in passing to the negative element, is not at all dependent on the nature of that element, but upon the facility with which the hydrogen is removed therefrom.

II. Where wrought or malleable iron is the electro-positive metal and sulphuric acid or sulphuric and nitric acids, diluted with water, are the compound conducting-fluid of a battery, the water is decomposed by that metal, hydrogen is evolved, and the equivalent of oxygen combines with the iron, forming an oxide, which afterward unites with the sulphuric acid and forms sulphate of iron. The hydrogen evolved from the decomposition of the water, having nothing to combine with, is set free, and as the state of cohesion of the carbonaceous electro-negative substance or plate contained in the inner cell favors its attraction and adhesion, it is rapidly conveyed to the surface of that plate, and if not removed will form an impediment to the voltaic or electric discharge. If the electro-negative plate be inclosed within a porous diaphragm, cup, or inner cell filled with nitric acid, or with cold sulphuric acid and bichromate of potash diluted with water, or with a hot solution of bichromate of potash, the hydrogen within that cell will act upon the acids, forming water, and, in case of the use of nitric acid, setting deutoxide of nitrogen free, which, in coming in contact with the adjacent air, escapes in the form of nitrous-acid gas.

III. The electro-negative substance or plate should have a surface to which hydrogen cannot strongly adhere, but one from which it may be rapidly removed. To smooth surfaces it readily adheres; from rough ones it is easily repelled. The electro-negative plate, it is to be understood, does not contribute to the production of power, and it is of no further value than as a means for the removal of the hydrogen—the second element of the intervening compound fluid between the electro-positive and electro-negative plates.

IV. The nearer the electro-positive and electro-negative plates can be brought together without touching one another the greater the quantity of electricity developed, though the intensity remains unchanged, for the quantity, circumstances being equal, is exactly in proportion to the surface of the negative plate exposed, provided there is no obstacle to be overcome, every asperity of its surface presenting a radiating-point to the positive plates. A large extent of surface of the positive metal within certain limits, in many operations, is unnecessary, although too great a deficiency would be attended with unprofitable results.

V. The fewer the cells that will answer the purpose the more economical will it be as to the cost of running. A diaphragm or double-celled battery, or one comprising a porous cup or inner cell, provided it be large, is sufficient to produce any amount of action required where no resistance is offered to the free passage of the voltaic discharge.

VI. Deep outer cells in a double-celled battery are favorable to the development of electricity, as they admit of ample space at their bottoms for the deposit of the sulphates or other salts formed by the elements without impeding the action of the acids on the plates.

VII. In a battery in which iron is the electro-positive metal, as soon as the decomposing liquid (dilute sulphuric and nitric acids) becomes saturated with the sulphate of iron no further galvanic action can take place, although the liquid may still remain intensely sour; but on adding more water to the solution immediate activity and power are restored, where before it was inert.

Figure 1 shows a vertical section of the battery in full operation. A A denote the exterior vessel—say about five and a quarter inches in diameter and eight inches in depth inside—which may be formed of glass, glazed pottery, or other materials suitable for use; B B, a smaller vessel or cell of unglazed pottery, placed within the vessel above named, about two and a half inches in diameter and seven inches in depth inside; C C, a series of wrought or malleable iron bars or rods, about three-fourths of an inch square and seven and a half inches in length, suspended in the outer cell, as near as possible without touching each other or the outer surface of the porous cup, connected together at the top by means of a copper plate, P P, or wire, secured by binding-screws and constituting the electro-positive plates; D, a rod or prism, about one inch and a half square and eight inches in length, formed of hard gas-coke, and suspended in the porous cup or inner cell without touching its sides, connected at the top to the discharging copper wire by means of a binding-screw, and serving as the electro-negative plate; e e, spaces within the outer cell, filled with sulphuric acid or sulphuric and nitric acids diluted with water, constituting the compound conducting intermediate fluid; f f, spaces within the porous cup or inner cell, filled with nitric acid or with sulphuric acid and bichromate of potash diluted with water, forming the exciting decomposing agent for removing the hydrogen from the electro-negative plate; g, a form made of pottery, glass, or wood, on which rest the porous cup and electro-positive plates.

Fig. 2 denotes a horizontal section of Fig. 1; A A, the exterior vessel; B B, the porous cup or inner cell; C C, wrought or malleable iron bars or rods radiating from the porous cup, and constituting the electro-positive plates; D, the square rod or prism, formed of hard gas-coke, and constituting the electro-negative plate within the porous cup or inner cell. The intervening spaces are understood to be filled with acids, as described under Fig. 1.

Fig. 3 denotes a horizontal section of Fig. 2, modified by extending the iron radiating electro-positive plates of the outer cell, in cases where it is desirable the power of the battery should be enlarged.

Fig. 4 is also a modification of Fig. 2, in which C' C' denote the electro-positive plate in the outer cell, consisting of wrought or malleable iron, bent in the form of a cylinder, and placed as near as practicable, without touching, round the porous cup or inner cell.

To put this battery in operation the spaces within the outer cell are first filled with about five parts, by measure, of sulphuric acid and ninety-five parts of water, or with about two and a half parts each of sulphuric and nitric acids diluted with ninety-five parts of water in case a stronger current is desired. Then the spaces within the porous cup or inner cell are filled with nitric acid; or, in cases where only a moderate power is required, this cell may be filled with a solution of about one part each of sulphuric acid and bichromate of potash and two parts of water, cold; but where great intensity of power is desired a saturated solution of bichromate of potash alone, applied hot, will serve the end while warm. In either case, as the acids within the inner cell become exhausted from decomposition, they must be replenished by a self-feeding fountain or supplied by an attendant by hand. So, also, with the sulphuric and nitric acids in the outer cell, as they become exhausted or inert from being saturated with sulphate of iron more acid must be supplied in the one case and water in the other, and activity will be restored.

This arrangement of the positive plate in separate bars or rods radially around the negative plate enables us to employ a large amount of surface in the positive cell, so that thereby, being able to diminish the number of cells required for a battery of given power, economy of construction and of space and weight is obtained. It also enables this increased surface of the positive plate to be brought into closer proximity to the negative plate than by other arrangements, thereby, as experiment shows, increasing the effective power of the battery, as well as the compactness thereof.

Other advantages might be mentioned, but we do not deem it necessary here to set them forth.

What we claim as our invention, and desire to secure by Letters Patent, is—

The arrangement of the separate iron positive bars or rods C C radially around and in combination with the carbonaceous negative plate D, substantially as and for the purposes herein specified.

D. JAY BROWNE.
     CYRUS W. BALDWIN.

Witnesses:
 FRANCIS RAYMOND,
 DANIEL SHARP.